(12) United States Patent
Futahashi et al.

(10) Patent No.: US 7,770,697 B2
(45) Date of Patent: Aug. 10, 2010

(54) ENERGY RECOVERING METHOD AND SYSTEM IN HYDRAULIC LIFT DEVICE OF BATTERY OPERATED INDUSTRIAL TRUCKS

(75) Inventors: Kensuke Futahashi, Takasago (JP); Hiroshi Satou, Takasago (JP); Masataka Kawaguchi, Takasago (JP); Tomohiro Akaki, Takasago (JP); Fujio Eguchi, Sagamihara (JP); Keizo Ogino, Nagaokakyo (JP); Shingo Yuguchi, Nagaokakyo (JP); Kazuhito Kawashima, Nagaokakyo (JP); Michio Akao, Nagaokakyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 384 days.

(21) Appl. No.: 11/663,534

(22) PCT Filed: Feb. 13, 2006

(86) PCT No.: PCT/JP2006/302899

§ 371 (c)(1),
(2), (4) Date: Jun. 26, 2007

(87) PCT Pub. No.: WO2006/090655

PCT Pub. Date: Aug. 31, 2006

(65) Prior Publication Data
US 2008/0128214 A1 Jun. 5, 2008

(30) Foreign Application Priority Data
Feb. 25, 2005 (JP) ............................. 2005-052162

(51) Int. Cl.
*B66F 9/22* (2006.01)
*F15B 21/14* (2006.01)
*F16D 31/02* (2006.01)

(52) U.S. Cl. .................... 187/224; 187/275; 60/414; 60/484

(58) Field of Classification Search ............... 414/636; 187/224, 275; 318/293, 34; 60/477, 479, 60/481, 484, 911, 413, 414; 91/459, 361; 180/422
See application file for complete search history.

(56) References Cited

U.S. PATENT DOCUMENTS
3,512,072 A * 5/1970 Arvin et al. ................. 320/127
(Continued)

FOREIGN PATENT DOCUMENTS
EP 0 050 296 B1 4/1982
JP 52-81856 A 7/1977
JP 55-155503 A 12/1980
(Continued)

*Primary Examiner*—Walter Benson
*Assistant Examiner*—Eduardo Colon-Santana
(74) *Attorney, Agent, or Firm*—Birch, Stewart, Kolasch & Birch, LLP

(57) ABSTRACT

An energy recovering system in a hydraulic lift device of a battery operated industrial truck. With the system, working oil can be supplied to other hydraulic actuators while energy recovering operation is performed by the hydraulic lift device, occurrence of pressure pulsation in the working oil can be prevented, and energy recovering efficiency is increased. The hydraulic lift device comprises a lift cylinder (1) for lifting a fork F, an electric motor (4) rotated by power supply from a battery (5), a hydraulic pump (3) for supplying pressurized oil to the lift cylinder (1), a control valve (14) disposed in a pressurized oil supply path (23), and a controller (17). The controller (17) controls the opening of the control valve (14) and rotation speed of the electric motor (4) which functions as an electric generator driven by the hydraulic pump (3) rotated by the action of the pressurized oil returning from the lift cylinder (1) when a load is lowered so that the generated electricity charges the battery (5) to recover the potential energy of the load.

14 Claims, 8 Drawing Sheets

U.S. PATENT DOCUMENTS

| | | | |
|---|---|---|---|
| 4,330,738 A * | 5/1982 | Paramythioti et al. | 318/128 |
| 4,723,107 A * | 2/1988 | Schmid | 322/35 |
| 4,761,954 A * | 8/1988 | Rosman | 60/414 |
| 5,505,043 A * | 4/1996 | Baginski et al. | 60/477 |
| 6,460,332 B1 * | 10/2002 | Maruta et al. | 60/414 |
| 6,922,989 B2 * | 8/2005 | Nagura et al. | 60/414 |
| 7,086,226 B2 * | 8/2006 | Oguri | 60/414 |
| 7,249,457 B2 * | 7/2007 | Raszga et al. | 60/419 |
| 7,600,612 B2 * | 10/2009 | Passeri | 187/224 |
| 2005/0036894 A1 | 2/2005 | Oguri | |
| 2007/0130933 A1 * | 6/2007 | Yoshino | 60/469 |

FOREIGN PATENT DOCUMENTS

| | | |
|---|---|---|
| JP | 57-70975 A | 5/1982 |
| JP | 2-28499 A | 1/1990 |
| JP | 4-179698 A | 6/1992 |
| JP | 4-347381 A | 12/1992 |
| JP | 7-125994 A | 5/1995 |
| JP | 2539648 Y2 | 4/1997 |
| JP | 2880887 B2 | 1/1999 |
| JP | 11-165995 A | 6/1999 |
| JP | 2000-351574 A | 12/2000 |
| JP | 2004-84470 A | 3/2004 |

* cited by examiner

ENERGY RECOVERING METHOD AND SYSTEM IN HYDRAULIC LIFT DEVICE OF BATTERY OPERATED INDUSTRIAL TRUCKS

TECHNICAL FIELD

The present invention relates to a method and system for recovering the potential energy generated by a hydraulic lift device of a battery operated industrial tracks such as a forklift truck or the like, in which a hydraulic pump for supplying pressurized working fluid to a lift cylinder to raise a load is allowed to work as a hydraulic motor by allowing the pressurized working fluid to return from the lift cylinder to the hydraulic pump when the load is lowered, and an electric motor for driving the hydraulic pump is allowed to work as an electric generator to charge the battery to recover the potential energy of the load. The system can be composed to be compact and capable of supplying working fluid to other hydraulic actuators while the load lowering operation is carried out. Further, occurrence of pressure pulsation in the working oil can be prevented, operability is improved, and energy recovering efficiency is increased.

BACKGROUND ART

As a battery operated industrial truck equipped with a load handling hydraulic device having an electric motor for driving a hydraulic motor, a forklift truck is known for example, in which a hydraulic pump is allowed to function as a hydraulic motor driven by working oil returning from a lift cylinder when a load is lowered and an electric motor connected to the pump is allowed to function as an electric generator to charge the battery to recover the potential energy of the load.

There has been disclosed energy recovering systems, for example in Japanese Laid-Open Patent Application No. 2-169499 and in U.S. Pat. No. 5,505,043, in which the hydraulic pump is rotated reversely by the working fluid pushed out from the lift cylinder in the lowering operation to function as an electric generator.

The system disclosed in said JP 2-169499 is composed such that an electromagnetic clutch is provided between the electric motor and the hydraulic pump, power transmission between the hydraulic pump and the motor is disconnected by the electromagnetic clutch when sufficient lowering speed is not obtained due to shortage of working fluid flow owing to insufficient weight of the load and therefore energy recovering is not possible, thereby saving energy.

The lift device disclosed in said U.S. Pat. No. 5,505,043 comprises a pair of a hydraulic pump and a DC motor for supplying oil to the lift cylinder and auxiliary means.

Further, in Japanese Laid-Open Patent Application No. 2003-252588 is disclosed a system in which the electric motor and the hydraulic pump which can be operated also as a hydraulic motor are controlled in rotation speed when recovering the potential energy of the load, flow and pressure of working oil are controlled so that the load is lowered at a predetermined speed, thereby eliminating energy loss due to pressure loss and heat generation.

However, with the systems disclosed in said JP 2-169499 and U.S. Pat. No. 5,505,043, potential energy of the load can be effectively utilized, but there is a problem that supplying pressurized oil to other actuators to actuate other devices is not possible by using the same hydraulic pump connected to the electric motor while operation of supplying working oil to the lift cylinder or recovering potential energy of the load is performed.

Further, the lift device disclosed in said U.S. Pat. No. 5,505,043 has disadvantages that a plurality of hydraulic pumps and a plurality of electric motors are needed, construction becomes complicated, and weight is increased.

The system disclosed in said JP 2003-252588 has a disadvantage that oil pressure pulsation occurs while recovering the potential energy of the load, which deteriorates operability of the recovering system and reduces energy recovering efficiency.

DISCLOSURE OF THE INVENTION

The present invention was made in light of the problems of the prior art, and the object of the invention is to provide a method and a compact system for recovering the potential energy generated by a hydraulic lift device in a battery operated industrial tracks such as a forklift truck or the like, in which working fluid can be supplied to other actuators while performing the energy recovering operation, occurrence of oil pressure pulsation in the energy recovering operation is prevented, operability is increased, and energy recovering efficiency is improved.

To attain the object, the invention proposes an energy recovering method in a hydraulic lift device of a battery operated industrial truck which is provided with a lift cylinder for lifting a lift means, an electric motor driven by a battery power source, a hydraulic pump for supplying pressurized working fluid to said lift cylinder to lift said lift means, and a control valve disposed between said lift cylinder and said hydraulic pump, whereby said electric motor is allowed to function as an electric generator driven by said hydraulic pump which is allowed to work as a hydraulic motor driven by pressurized working fluid returning from said lift cylinder to the hydraulic pump when a load on said lift means is lowered, and potential energy of the load is recovered as electric power to the battery, wherein lowering speed of said lift means is controlled by controlling the amount of opening of said control valve for controlling the flow rate of the pressurized working fluid returning to the hydraulic pump and rotation speed of said electric motor when a load on said lift means is lowered.

In the energy recovering method of the invention, it is preferable that said control valve is opened to be larger than the amount of valve opening corresponding to rotation speed of the electric motor, which rotation speed depends on the flow rate of the returning working fluid and therefore depends on the amount of the valve opening, so that lowering speed of said lift means is controlled by controlling rotation speed of the electric motor.

Further, when torque is deficient to rotate the hydraulic pump to allow it to work as a hydraulic motor because of light weigh of the load on the lift means, the electric motor is rotated before the control valve is opened in the initial stage of the lowering operation.

The energy recovering method of the invention can be applied in the case said hydraulic lift device is provided with a second actuator for supplying pressurized fluid by means of said hydraulic pump via a second control valve. In this case, rotation speed of said electric motor is preferably controlled to correspond only to the lowering speed of the lift means when operation of lowering said lift means and operation of said actuator are performed simultaneously.

When a directive is sent to supply pressurized working fluid to the second actuator while the lift means is being lowered, this could lead to the occurrence of fast and furious change in the rotation speed of the electric motor. By controlling the rotation speed of the electric motor to correspond only to the lowering speed of the lift means, fast and furious change of the rotation speed of the electric motor can be suppressed and fast and furious change in lowering speed of the lift means can be prevented.

As the second actuator can be cited a tilt cylinder for tilting a mast of a forklift truck having a fork installed to the mast movably along the mast, a driving device for moving claws of the fork, a power steering gear, a braking device, and others.

The energy recovering system of the invention is provided with a lift cylinder for lifting a lift means, an electric motor driven by a battery power source, a hydraulic pump for supplying pressurized working fluid to said lift cylinder to lift said lift means, and a control valve disposed between said lift cylinder and said hydraulic pump, whereby said electric motor is allowed to function as an electric generator driven by said hydraulic pump which is allowed to work as a hydraulic motor driven by pressurized working fluid returning from said lift cylinder to the hydraulic pump when a load on said lift means is lowered, and potential energy of the load is recovered as electric power to the battery, wherein are provided a controller which controls lowering speed of said lift means by controlling the amount of opening of said control valve for controlling the flow rate of the pressurized working fluid returning to said hydraulic pump and the rotation speed of said electric motor.

In the energy recovering system of the invention, when recovering potential energy of the load on the lift means, the lowering speed of the lift means is controlled by the controller through controlling the amount of opening of the control valve and the rotation speed of the electric motor.

The energy recovering system of the invention is applicable also to a hydraulic lift device in which a hydraulic motor driven by pressurized working fluid returning from said lift cylinder is disposed in a fluid path for recovering the working fluid to a working fluid reservoir tank via said control valve, and said hydraulic motor is connected to said electric motor with a one-way clutch which allows torque transmission only from said hydraulic motor to said electric motor.

In the invention, one-way clutch means a torque transmission means which can transmit driving torque from the hydraulic motor to the electric motor and can not transmit driving torque from the electric motor to the hydraulic motor.

The energy recovering system of the invention is applicable also to a hydraulic lift device in which a second actuator for carrying out the other operation, for example, operation of a tilt cylinder to tilt a mast of a forklift truck having a fork installed to the mast movably along the mast, is provided in addition to said lift cylinder, and pressurized working fluid is supplied by said hydraulic pump to said second actuator via a second control valve.

In the energy recovering system of the invention, said controller is preferably provided with an arithmetic circuit for decreasing responsivity in speed change of said electric motor to a directive to change rotation speed of said electric motor. By this, fast and furious change of rotation speed of the electric motor is suppressed.

In the case the hydraulic lift device is provided with the second actuator, when the energy recovering operation and supply of pressurized working fluid to the second actuator are performed simultaneously, fast and furious change occurs in the rotation speed of the electric motor if the responsidity is not decreased, and fast and furious change occurs in pressure of the working fluid. The fast and furious change of rotation speed of the electric motor can be suppressed by said arithmetic circuit.

Further, it is preferable that said hydraulic motor is larger in theoretic volume capacity of working fluid flow than that of said hydraulic pump, and rotation speed of said electric motor is substantially equal both at rated speeds of tilting operation and lowering operation.

Furthermore, it is preferable that a pressure sensor for detecting pressure in a bottom oil chamber of said lift cylinder is provided, and responsivity in speed change of said electric motor is changed based on the pressure detected by said pressure sensor. Concretively, when the load on the lift means is heavy, the responsivity in the rotation speed of the electric motor is decreased so that fine-adjusting operation range is widened.

It is further preferable that a pressure sensor for detecting pressure in a bottom oil chamber of said lift cylinder, a band pass filter for computing pressure pulsation value from the pressure detected by said pressure sensor, and an arithmetic circuit for adding aintiphased pulsation value of said pulsation value to a rotation speed directive for said electric motor, are provided, thereby attenuating pressure pulsation in the working fluid.

According to the present invention, by controlling the lowering speed of the lift means through controlling the amount of opening of the control valve for controlling the flow rate of the pressurized working fluid returning to the hydraulic pump and the rotation speed of the electric motor when the lift means is lowered, occurrence of pressure pulsation in the working fluid is prevented, easiness in operability is improved, and energy recovering efficiency is improved.

In the energy recovering method of the invention, by opening the control valve to be larger than the amount of valve opening corresponding to rotation speed of the electric motor, which rotation speed depends on the flow rate of the returning working fluid and therefore depends on the amount of the valve opening, so that lowering speed of said lift means is controlled by controlling rotation speed of the electric motor, pressure loss in the control valve can be reduced and energy recovering efficiency is increased.

Further, by allowing the electric motor to rotate before the control valve is opened in the initial stage of the lowering operation when torque is deficient to rotate the hydraulic pump to allow it to work as a hydraulic motor because of light weigh of the load on the lift means, the operation of the hydraulic pump as a hydraulic motor in the initial stage of the energy recovering operation is ensured.

In the energy recovering method of the invention, by providing to the hydraulic lift device a second actuator for supplying pressurized fluid by means of the hydraulic pump via a second control valve and by controlling the rotation speed of the electric motor to correspond only to the lowering speed of the lift means when operation of lowering the lift means and operation of said actuator are performed simultaneously, fast and furious change of the electric motor is suppressed, fast and furious change of the lowering speed is prevented, and easy operability is ensured.

According to the energy recovering system of the invention, by providing a controller for controlling lowering speed of the lift means by controlling the amount of opening of the control valve to control the flow rate of the pressurized working fluid returning to the hydraulic pump and for controlling the rotation speed of the electric motor, occurrence of pressure pulsation in the working fluid in the energy recovering operation is prevented, operability is improved, and energy recovering efficiency is increased.

Further, in the energy recovering system of the invention, in the case a hydraulic lift device is employed in which a hydraulic motor driven by pressurized working fluid returning from the lift cylinder is disposed in a fluid path for recovering the working fluid to a working fluid reservoir tank via the control valve, and the hydraulic motor is connected to the electric motor with a one-way clutch which allows torque transmission only from the hydraulic motor to the electric motor, supply of working fluid to other actuators is possible while performing the energy recovering operation, occurrence of pressure pulsation in the working fluid in the energy recovering operation is prevented, operability is improved, and recovering efficiency is improved by compact construction of the system.

As the rotation of the hydraulic pump is not transmitted to the hydraulic motor when the lift means is raised by pressurized working fluid supplied by the hydraulic pump driven by the electric motor, the hydraulic motor is not driven by the electric motor in the raising operation, consumption of useless energy is prevented, and when the hydraulic motor is driven by the returning pressurized working fluid when the lift means is lowered, the output torque of the hydraulic motor is transmitted to the electric motor so that it is operated as an electric generator.

Rotation of the hydraulic pump does not interfere the rotation of the hydraulic motor, rather the hydraulic pump may be driven by the hydraulic motor when it is recovering the potential energy of the load on the lift means.

In addition, as the electric motor serves as both an electric motor for driving the hydraulic pump for supplying pressurized working fluid and as an electric generator driven by the hydraulic motor for recovering energy, installation space is saved compared with the case a separate electric generator (or electric motor) is provided, and total weight of the system can be decreased.

In the energy recovering system of the invention, by providing to the controller an arithmetic circuit for decreasing responsivity in speed change of the electric motor to a directive which directs to change rotation speed of the electric motor, responsivity to speed change of the electric motor is decreased, fast and furious change in speed is suppressed, and easy operability is ensured.

In the energy recovering system of the invention, by adopting as the hydraulic motor a motor which is larger in theoretic volume capacity of working fluid flow than that of the hydraulic pump, and allowing the rotation speed of the electric motor to be substantially equal both at the rated speeds of tilting operation and lowering operation, fast and furious change of rotation speed of the electric motor can be suppressed when the potential energy recovering operation and supply of pressurized working fluid to the second actuator are performed simultaneously.

In the energy recovering system of the invention, by providing a pressure sensor for detecting pressure in a bottom oil chamber of said lift cylinder is provided, and changing the responsivity in speed change of said electric motor based on the pressure detected by said pressure sensor, it becomes possible to suppress fast and furious speed change of the electric motor by decreasing the responsivity when the load on the lift means is heavy.

In the energy recovering system of the invention, by providing a pressure sensor for detecting pressure in a bottom oil chamber of said lift cylinder, a band pass filter for computing pressure pulsation value from the pressure detected by said pressure sensor, and an arithmetic circuit for adding aintiphased pulsation value of said pulsation value to a directive for directing rotation speed of said electric motor, pressure pulsation in the working fluid occurring in the energy recovering operation can be attenuated and energy loss is suppressed.

BEST MODE FOR CARRYING OUT THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The First Embodiment

Figure 1:
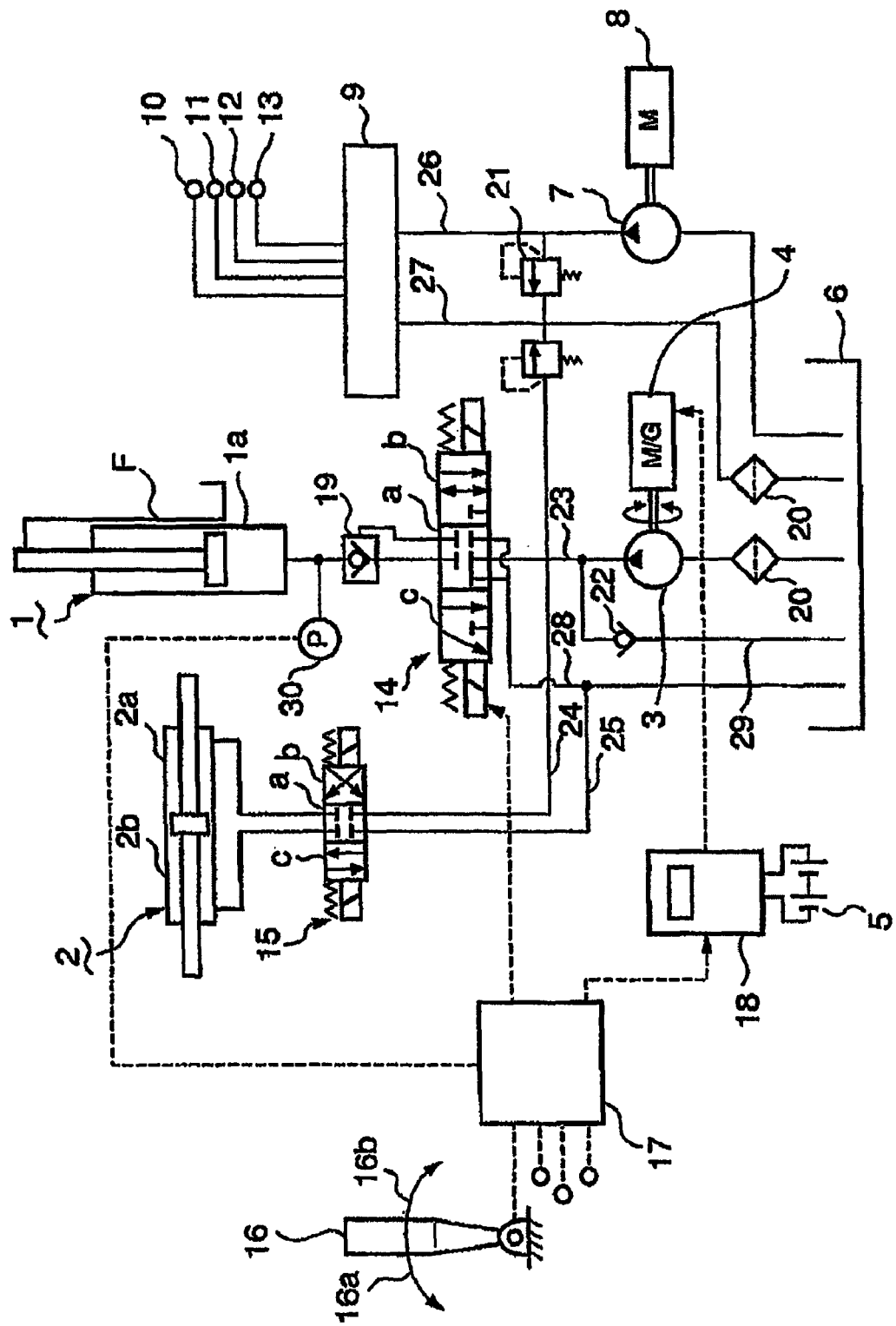
FIG. 1 is a schematic hydraulic lift circuit of the first embodiment according to the invention.
Figure 2:
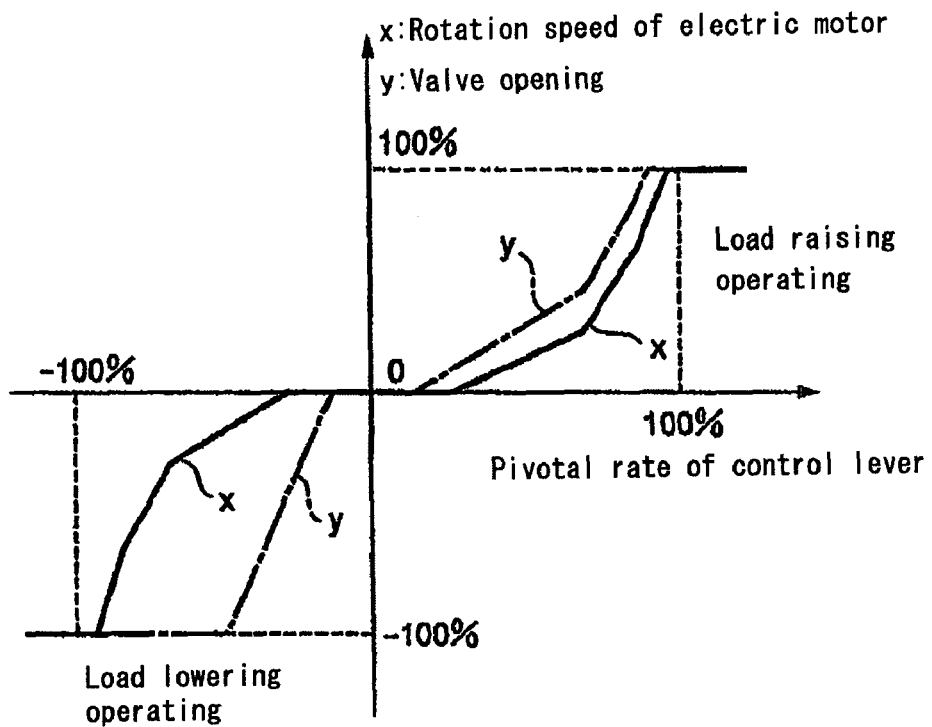
FIG. 2 is a diagram showing rotation speed x of the electric motor and the amount of opening of the control valve 14 vs. the pivotal rate y of the control lever in the first embodiment.

FIG. 1 is a schematic hydraulic lift circuit of the first embodiment according to the invention, and FIG. 2 is a diagram showing rotation speed x of the electric motor and the amount of opening of the control valve 14 vs. the pivotal rate y of the control lever in the first embodiment.

In FIG. 1, reference numeral 1 is a lift cylinder for lifting a fork F (lift means) of a forklift truck, 1a is a bottom oil chamber of the lift cylinder 1, 2 is a hydraulic cylinder composing a second actuator for driving another attachment of the forklift truck, for example, a driving device for driving claws not shown of the fork F. Reference numeral 3 is a hydraulic pump for supplying working oil from an oil tank 6 to oil chambers of the lift cylinder 1 and hydraulic cylinder 2, 5 is a set of batteries for supplying electricity to the electric motor 4.

Reference numeral 7 is a second hydraulic pump, which is driven by an electric motor 8, sucks the working oil in the oil tank 6 to pressurize it, and supply the pressurized oil via a valve unit 9 to other actuators, for example, to a tilt cylinder for tilting a mast to which the fork F is installed movably along the mast, to a power steering gear, to a braking device, and to oil supply paths 10-13 for supplying oil to other devices. Reference numeral 14 is a control valve disposed in an oil supply path 23 between the lift cylinder 1 and hydraulic pump 3, and 15 is a control valve disposed in an oil supply path 24 branching from the oil path 23 and an oil recovering path 25. Reference numeral 21 is a relief valve, and 22 is a one-way valve disposed in an oil recovering path 29.

Reference numeral 16 is a control lever arranged to be pivoted to the left as shown by arrow 16a and to the right as shown by an arrow 16b for allowing the fork F to be raised or lowered.

Reference numeral 17 is a controller which controls the amount of opening of the control valve 14 based on the pivotal rate of the control lever 16 and the pressure of the bottom oil chamber 1a of the lift cylinder 1 detected by a pressure sensor 30 inputted to the controller and at the same time controls rotation speed of the electric motor 4 via an inverter 18.

In the system of the first embodiment, when raising the fork F, the control lever 16 is turned to the direction of the arrow 16a to allow the port b of the control valve 14 to coincide with the oil path 23, thereby the oil pressurized by the hydraulic pump 3 is supplied to the bottom oil chamber 1a of the lift cylinder 1 through the oil path 23. When driving the another attachment device at the same time, by shifting valve position of the control valve 15 from the neutral position of port a so that the port b or port c coincide with the oil path 24, pressurized oil is supplied to the right oil chamber or the left oil chamber of the hydraulic cylinder 2.

When lowering the fork F, the control lever 16 is turned to the direction of the arrow 16b. By this, the supply of pressurized oil to the bottom oil chamber of the lift cylinder 1 is stopped, lowering of the fork F begins by the gravitational force of the load on the fork F and the fork F itself, and the pressurized oil in the bottom oil chamber 1a returns to the hydraulic pump 3 through the oil supply path 23. The hydraulic pump 3 is rotated by this returning oil to work as a hydraulic motor, the electric motor 4 connected to the hydraulic pump 3 is driven by the hydraulic pump 3 operating as a hydraulic motor to be operated as an electric generator, and the generated electric current is converted into direct current by the inverter 24 to be charged to the battery unit 5 connected to the inverter 24.

On the other hand, to the other actuators is supplied pressurized oil by means of the hydraulic pump 7 through the oil supply path 26 via the valve unit 9 and the oil supply paths 10-13 to operate the other devices. Reference numeral 19 is a one-way valve, 20 is a filter, and 27 is an oil recovering path.

Conventionally, lift speed of the lift means (fork F) is controlled by controlling the throttle area of the control valve 14, but in the first embodiment, the control valve 14 is opened steeply with respect to the pivotal rate of the control lever 16 in the lowering operation, i.e. in the potential energy recovering operation, as shown in FIG. 2, and the lowering speed of the fork F is controlled through the control of rotation speed of the electric motor 4.

According to the first embodiment, by controlling the lowering speed of the fork F through the control of rotation speed of the electric motor 4 with the control valve 14 steeply opened, excessive pressure rise in the control valve is prevented, pressure loss in the valve is decreased, energy recovering efficiency is increased, and reduction in operability can be prevented.

The Second Embodiment

Figure 3:
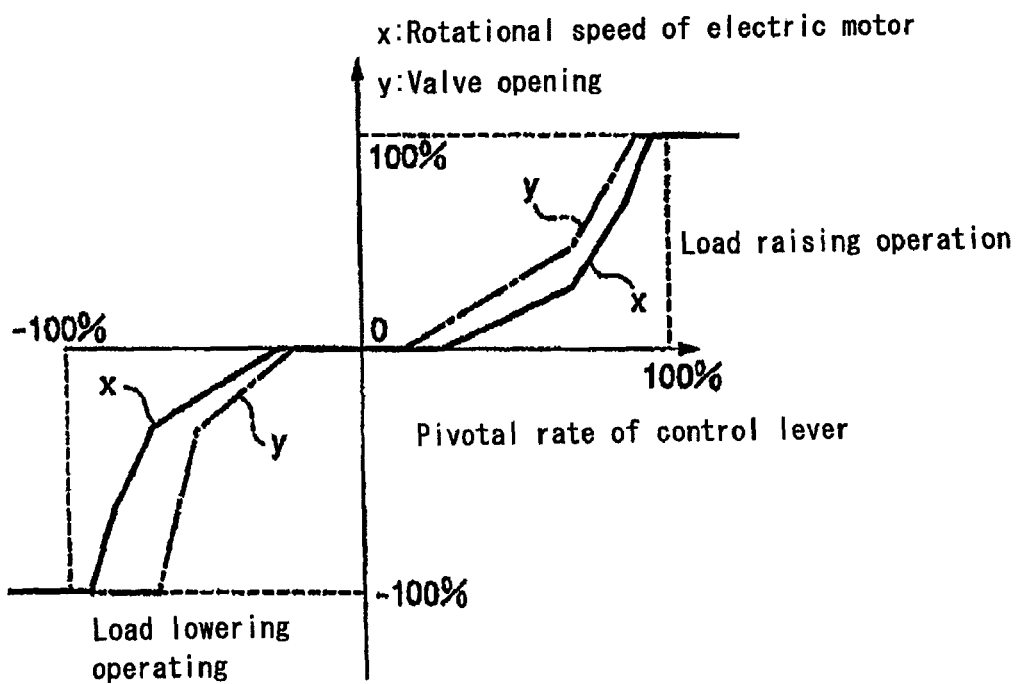
FIG. 3 is a diagram as in FIG. 2, showing the second embodiment of the invention.

FIG. 3 shows another example (the second embodiment) of controlling the lowering speed through the control of rotation speed of the electric motor 4 and the opening of the control valve 14 in the lowering operation. In the embodiment, as shown in FIG. 3, the lowering speed is controlled by controlling the opening of the control valve 14 in the initial range where the lowering speed is small and gentle control of the lowering speed is needed, and the lowering speed is controlled through the control of rotation speed of the electric motor 4 with the opening of the control valve 14 being steeply increased in the range where the lowering speed is large as is at the rated speed lowering. In this way, energy recovery efficiency can be increased by performing delicate control of the lowering speed.

The Third Embodiment

Figure 4:
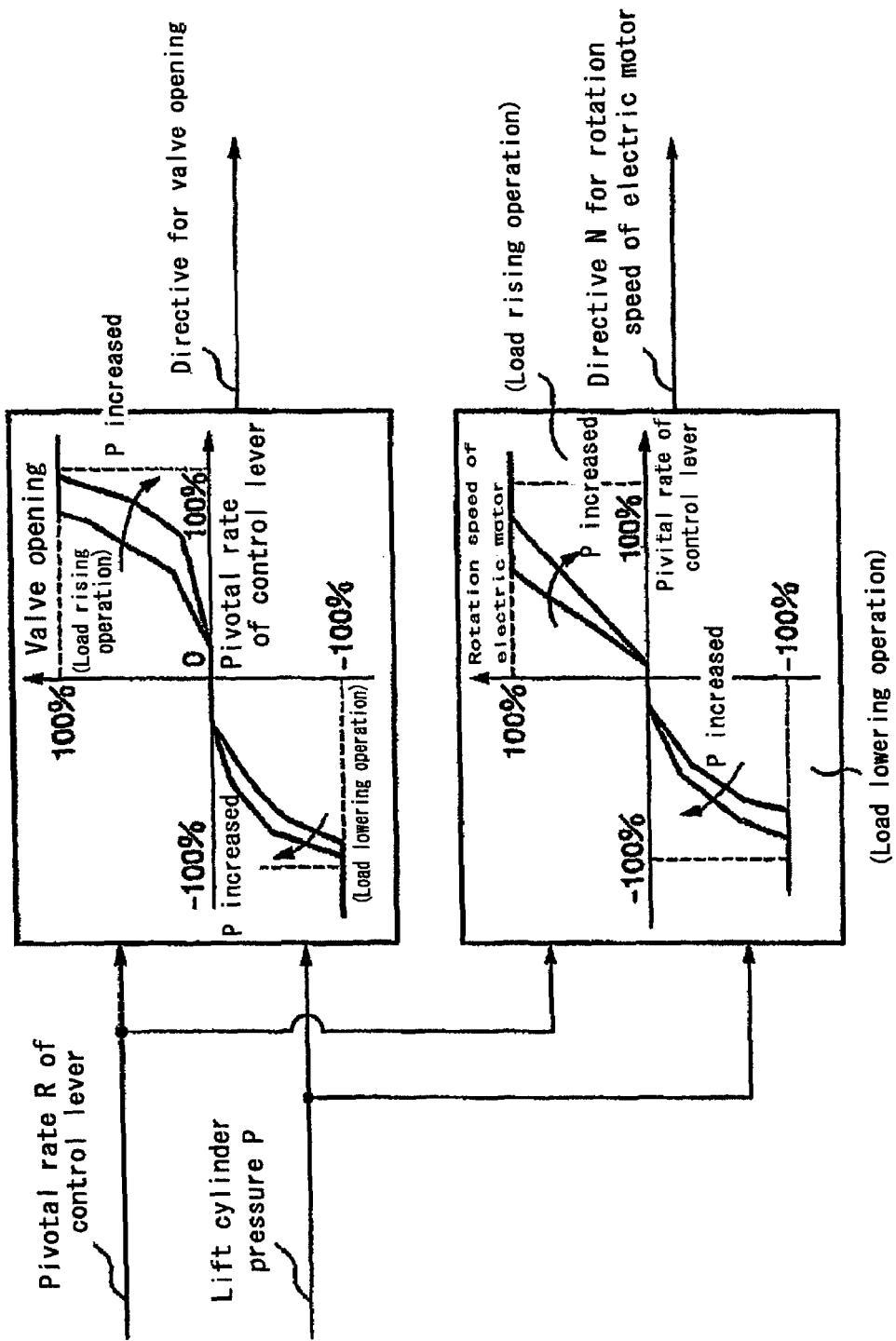
FIG. 4 is an example of controlling, showing the third embodiment of the invention.

FIG. 4 shows a further example (the third embodiment) of controlling the raising and lowering speed of the fork F. In the system of the first embodiment shown in FIG. 1, oil pressure P in the bottom oil chamber 1a of the lift cylinder 1, which pressure being dependent on the weight of the load, is detected by the pressure sensor 30, and the opening of the control valve 14 and the rotation speed of the electric motor 4 with respect to the pivotal rate of the control lever 16 are controlled according to the detected pressure P.

By controlling with the weight of the load on the fork F taken into consideration like this, the lowering of the fork F when the load on the fork F is heavy is performed smoothly, and energy recovery efficiency can be increased.

The Fourth Embodiment

Next, the fourth embodiment of the energy recovering system of the invention will be explained with reference to FIG. 5.

Figure 5:
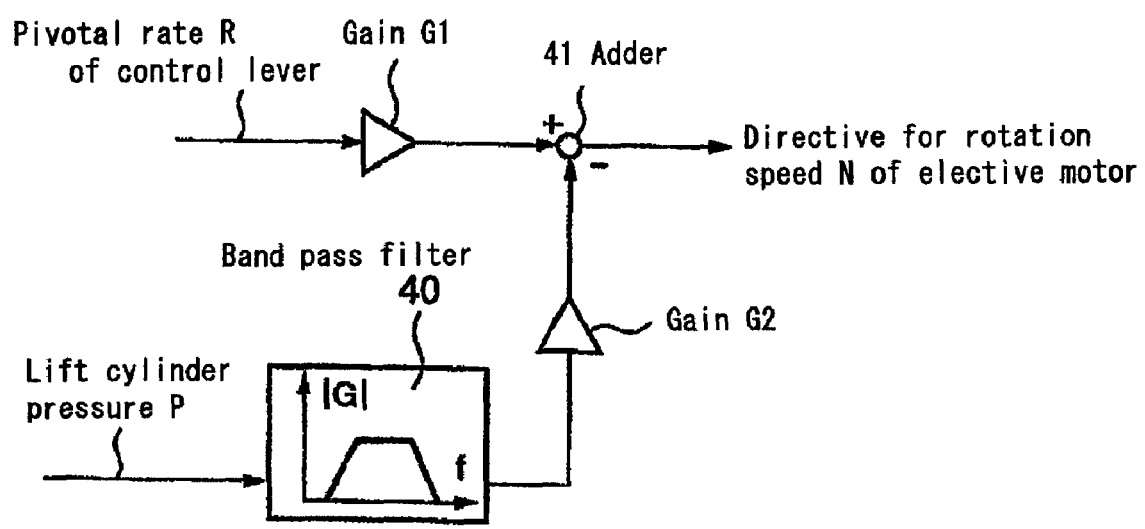
FIG. 5 is a schematic control circuit, showing the fourth embodiment of the invention.

FIG. 5 is a schematic control circuit, showing the fourth embodiment. As shown in the drawing, pulsation value of the pressure P detected by the pressure sensor 30 in FIG. 1 is computed by a band pass filter 40, directive number of rotations N is obtained by adding by means of an adder 41 a gain G2 of antiphased pulsation value of said pulsation value to gain G1 established based on the pivotal rate R of the control lever 16. The electric motor 4 is rotated at this directive number of rotations N. By this, pulsation of oil pressure occurring in the potential energy recovering operation is attenuated and energy loss can be decreased.

The Fifth Embodiment

Figure 6:
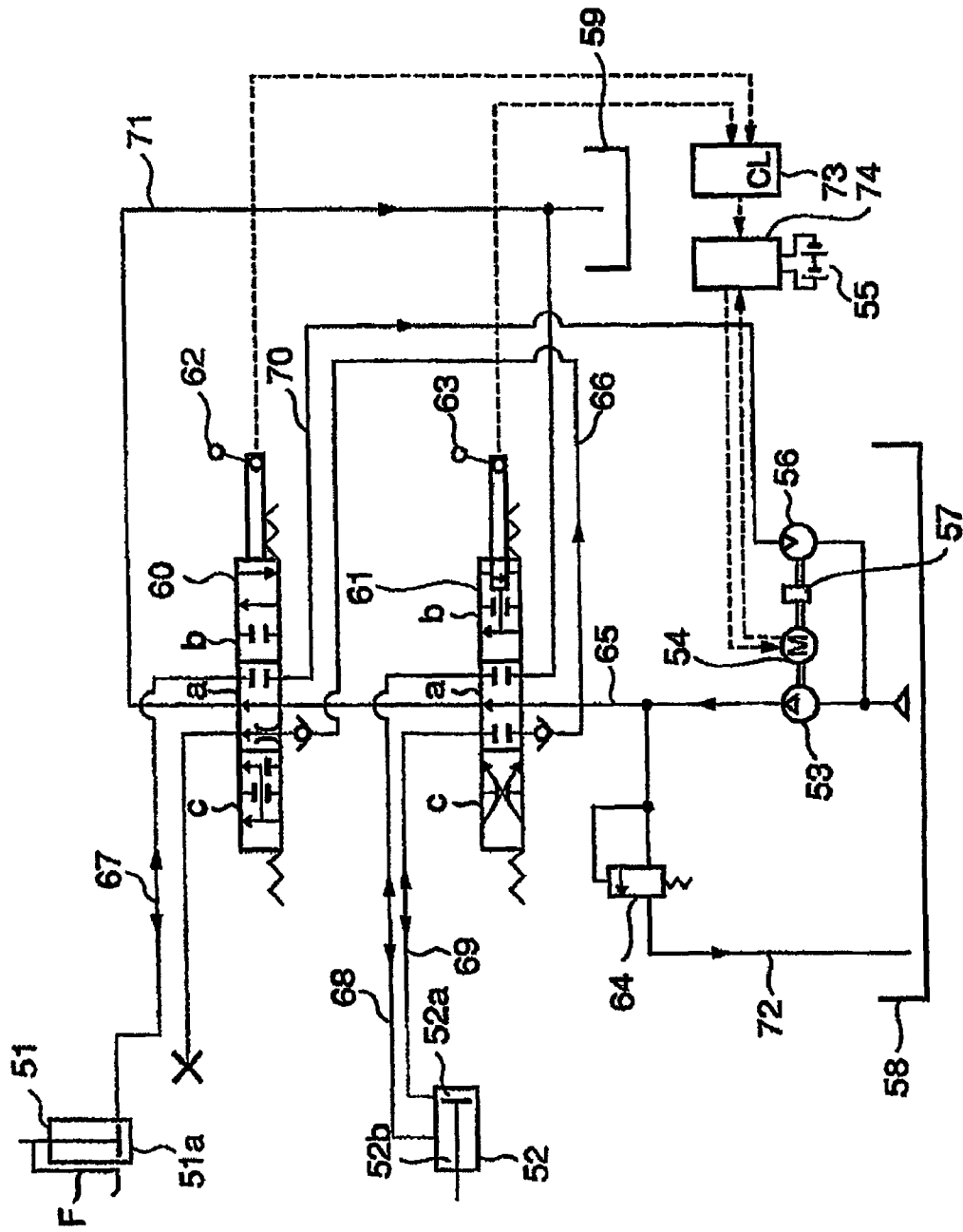
FIG. 6 is a schematic hydraulic lift circuit of the fifth embodiment of the invention.
Figure 7:
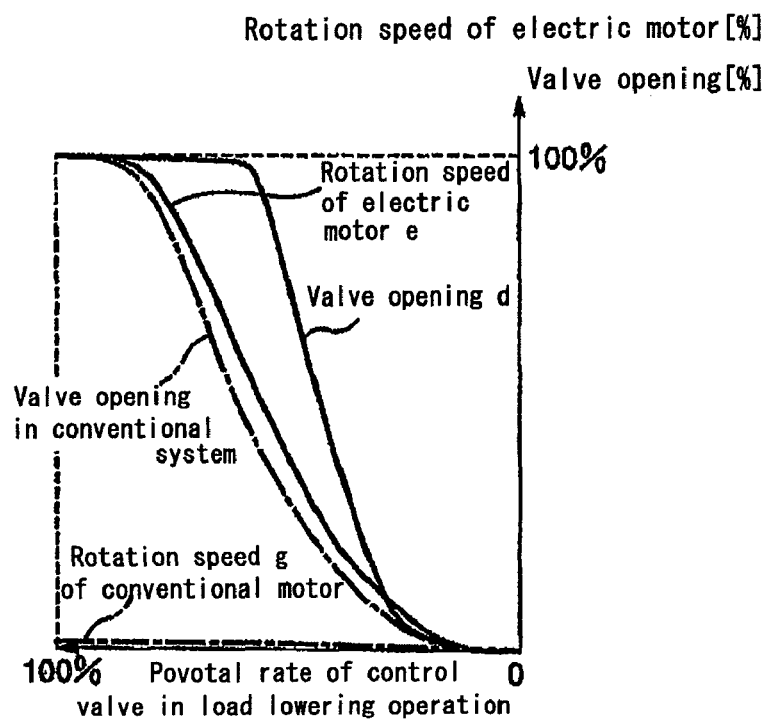
FIG. 7 is a diagram showing rotation speed of the electric motor and the amount of opening of the control valve vs. the pivotal rate y of the control lever in the fifth embodiment of the invention.

Next, the fifth embodiment of the energy recovering system of the invention will be explained with reference to FIGS. 6 and 7. FIG. 6 is a schematic hydraulic lift circuit of the fifth embodiment, and FIG. 7 is a diagram showing rotation speed of the electric motor and the amount of opening of the control valve vs. the pivotal rate of the control lever. In FIG. 6, reference numeral 51 is a lift cylinder for lifting the fork F of a fork lift truck, 52 is a tilt cylinder for tilting a mast to which the fork F is installed, 53 is a hydraulic pump driven by an electric motor 54 for sucking oil and pressurizing it for supplying the pressurized oil to oil chambers of the lift cylinder 51 and the tilt cylinder 52, and 55 is a battery unit for supplying electricity to the electric motor 54. The battery unit is connected to an inverter 74. When the hydraulic pump 53 is rotated by pressurized oil and the electric motor 54 connected to the hydraulic pump 53 is rotated to function as an electric generator, the electric power generated is converted to DC power by the inverter 74 to charge the battery unit 54.

Reference numeral 56 is a hydraulic motor disposed in a pressurized oil recovery path 70 connected to the bottom oil chamber 51a of the lift cylinder 51 and driven by the pressurized oil returning from the bottom oil chamber 51a. The electric motor 54 is driven by the hydraulic motor 56 to function as an electric generator to charge the battery unit 55 which is the power source for the electric motor 54.

Reference numeral 57 is a one-way clutch connected to rotating shafts of the electric motor 54 and hydraulic motor 56. By means of the one-way clutch, driving torque can be transmitted from the hydraulic motor 56 to the electric motor 54, but the driving torque of the electric motor 54 can not be transmitted to the hydraulic motor 56. Reference numerals 58 and 59 are oil tanks for reserving working oil, 60 is a control valve for controlling pressurized oil supply to the lift cylinder 51, 61 is a control valve for controlling pressurized oil supply to the tilt cylinder 52.

Reference numeral 62 is a control lever for manipulating the control valve 60, 63 is a control lever for manipulating the control valve 61, and 64 is a relief valve disposed in an oil recovery path 72 for allowing the oil in the oil supply path 65 to bypass to the oil tank 58 when the pressure in the oil supply path 65 is higher than an allowable pressure.

Reference numeral 73 is a controller to which pivotal rates of the control lever 62 and 63 are inputted, and which establishes a number of rotations of the electric motor 54 based on the inputted pivotal rates, and sends the determined number of rotations to the electric motor 54 via the inverter 74, whereby the inverter 74 takes in the actual number of rotations of the electric motor 54 and rotation speed of the electric motor 54 is controlled to be the established number of rotations.

In the system of the fifth embodiment, when the lift cylinder 51 and tilt cylinder 52 are not activated, pressurized oil is returned to the oil tank 59 through the path 65 and through a path 71.

When raising the fork F, the control lever 62 is manipulated so that the c port of the control vale 60 for lifting control coincides with the path 65 and pressurized oil is supplied by means of the hydraulic pump 53 to the bottom oil chamber 51a of the lift cylinder 51 through paths 66 and 67. When it is needed to tilt the fork F at the same time, the control lever 63 is manipulated so that the port b or c of the control valve 61 for tilt operation coincide with the oil supply path 65 and pressurized oil is supplied to the right chamber 52a or the left chamber 52b thorough an oil supply paths 68, 69, thereby the fork F is tilted backward or forward.

When lowering the fork F, the control lever 62 is manipulated so that the port b of the control valve 60 coincides with the oil recovery path 70 and pressurized oil is recovered from the bottom oil chamber 51 of the lift cylinder 51 thorough the oil recovering path 70. Then, the hydraulic motor 56 disposed in the oil recovering path 70 is rotated by the pressurized oil returning from the lift cylinder 51 through the recovering oil path 70 and the electric motor 54 connected by means of the one-way clutch to the hydraulic motor 56 is driven to function as an electric generator and the battery unit 55 connected to the inverter 54 is charged.

The driving torque of the hydraulic motor 56 is transmitted by the one-way clutch 57 and the hydraulic pump 53, on the other hand the driving torque of the electric motor 54 is not transmitted to the hydraulic motor 56.

As describe above, according to the fifth embodiment, the drive torque of the electric motor 54 to drive the hydraulic pump 53 is not transmitted to the hydraulic motor 56, so energy loss is eliminated which will occur if the driving torque of the electric motor 54 is transmitted uselessly to the hydraulic pump 56.

As the hydraulic pump 53 can be driven by the output torque of the hydraulic motor 56 and the electric motor 54 functions as an electric motor to drive the hydraulic pump 53 and also functions as an electric generator when driven by the hydraulic motor 56 in the lowering operation, installation space can be saved and total weight of the hydraulic lift device can be reduced.

In the system, the rotation speed of the electric motor 54 and the opening of the control valve 60 for lift operation are controlled according to the pivotal rate of the control lever 62 as shown in FIG. 7. In FIG. 7, a curve indicated by d and a curve indicated by e are respectively the pivotal rate of the control valve 60 and rotation speed of the electric motor 54 in the system of the present invention, and a curve indicated by f and a curve indicated by g are respectively the pivotal rate of control valve and rotation speed of electric motor in a conventional system when energy recovery operation is not performed.

As shown in FIG. 7, the lowering speed of the fork F is controlled by controlling the rotation speed of the electric motor 54 with the opening of the control valve 60 being steeply increased with respect to the pivotal rate of the control lever 62. The lowering speed of the fork F is controlled by the opening of the control valve 54 in the initial range of lowering operation with small pivotal rate of the control lever 62, and after the initial range the lowering speed of the fork F is controlled by controlling the rotation speed of the electric motor 54, as mentioned above.

By this, pressure loss in the control valve 60 can be decreased and energy recovering efficiency can be increased.

The Sixth Embodiment

Figure 8:
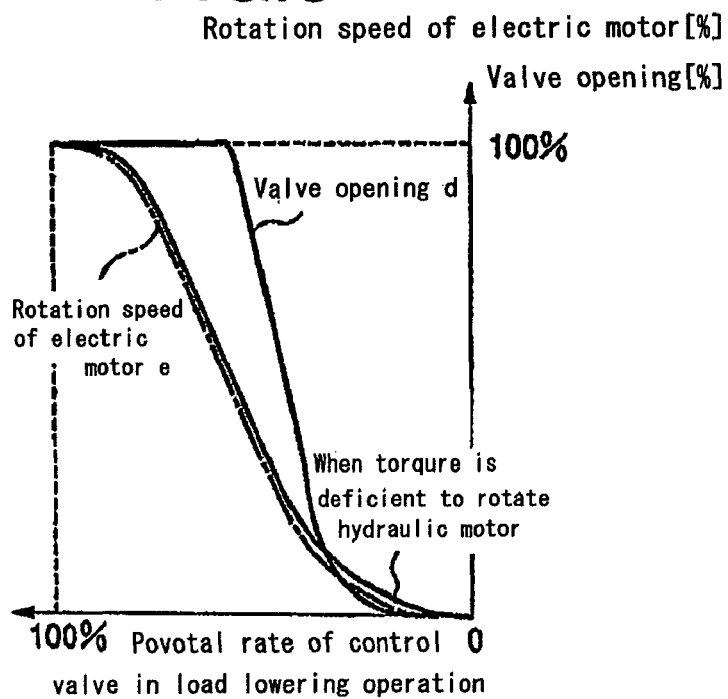
FIG. 8 is a diagram as in FIG. 6, showing the sixth embodiment of the invention.

When torque is deficient to rotate the hydraulic motor 56 because of light weigh of the load on the fork F, the electric motor 54 is rotated before the control valve 60 is opened in the initial stage of the control lever manipulation in the lowering operation as shown in FIG. 8.

This makes it possible to allow the lowering operation to start with certainty, thus easy operability can be ensured.

The Seventh Embodiment

Figure 9:
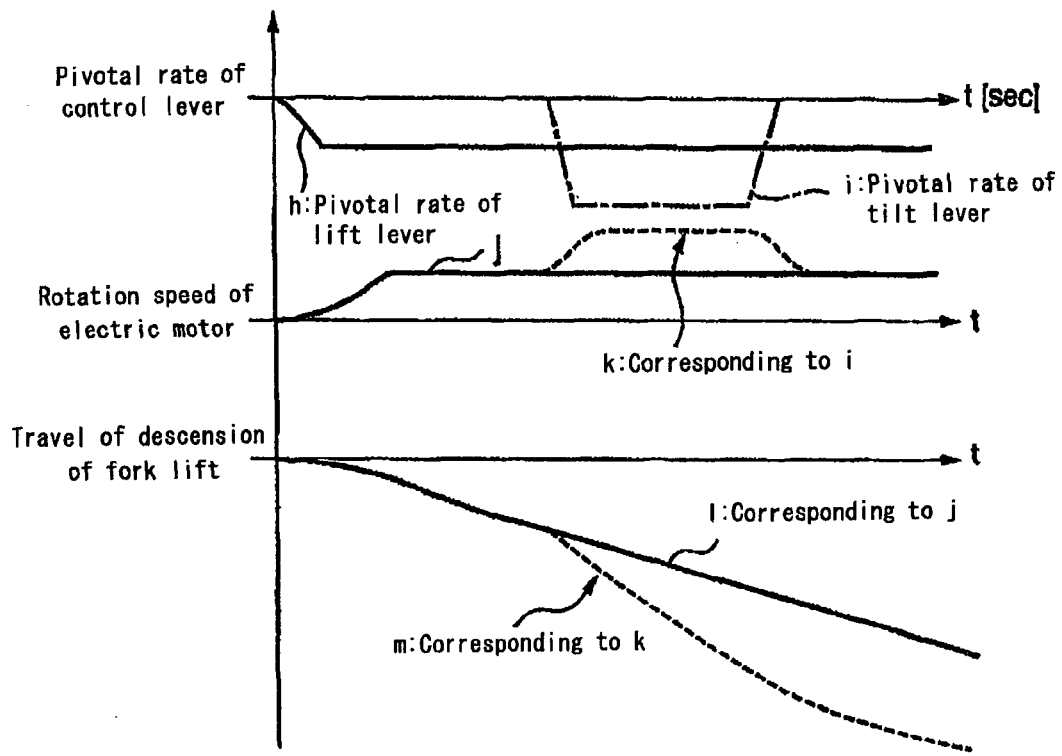
FIG. 9 is a diagram showing the pivotal rate of the control lever, rotation speed of the electric motor, and displacement of lift of the load, showing the seventh embodiment of the invention.

Next, the seventh embodiment of control method of the invention in the hydraulic lift device of the fifth embodiment shown in FIG. 6 will be explained. In FIG. 9, a line h shows the pivotal rate of the control lever 62 for lift operation in energy recovering operation, a line i shows the pivotal rate of the control lever 63 for tilt operation, a line j shows the number of rotations of the electric motor 54 corresponding to the pivotal rate h of the lift lever 62, a line k shows the number of rotations of the electric motor 54 corresponding to the sum of the pivotal rate of the lift lever 62 and that of the tilt lever 63, a line 1 shows the travel of descension of the fork F corresponding to the line j, and line m shows the travel of descension of the fork F corresponding to the line k.

When performing simultaneously lowering operation by the lift cylinder 51 and tilting operation by the tilt cylinder 52, in order to carry out control of both the operations, the pivotal rate i of the tilt lever 63 is neglected and the electric motor 54 is rotated only in correspondence with the pivotal rate h of the lift lever 62, by this, fast and furious change in the lowering speed of the fork F is suppressed and easy operability can be ensured.

The Eighth Embodiment

Next, the eighth embodiment will be explained with reference to FIG. 10. The eight embodiment of control method is for a hydraulic lift device with the arithmetic circuit shown in FIG. 10 being incorporated in the controller 7 of the hydraulic lift device of the fifth embodiment shown in FIG. 6.

Figure 10:
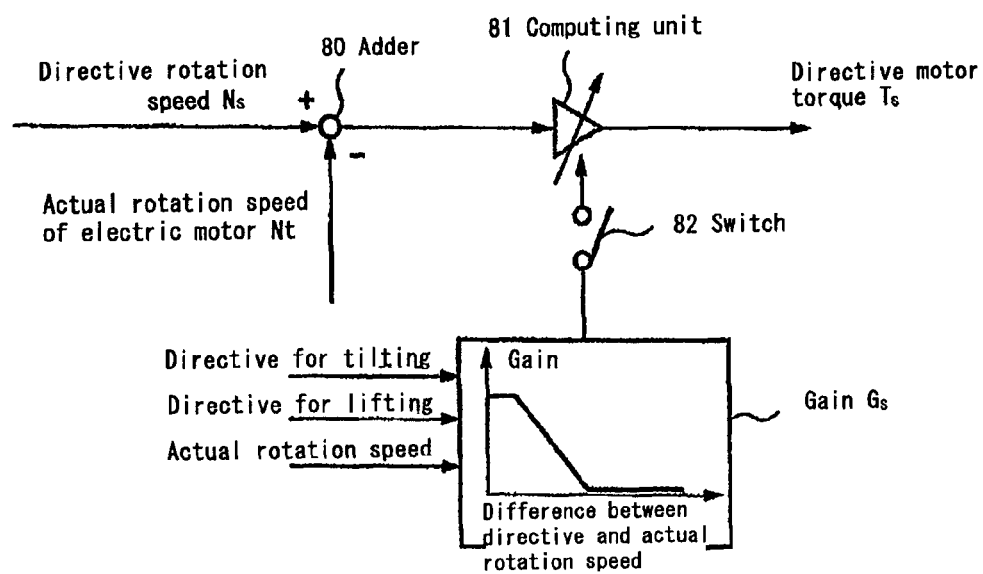
FIG. 10 is an arithmetic circuit, showing the eighth embodiment of the invention.

In FIG. 10, Ns is a directive number of rotations of the electric motor 54 when lifting and tilting operations are carried out simultaneously. Actual number of rotations Nt of the electric motor 54 detected by a detector not shown is added to the directive number of rotations Ns by an adder 80, then a gain Gs for decreasing responsivity in speed change of the electric motor 54 is imparted in a computing unit 81 by way of a switch 82, and the result is sent as a motor torque directive Ts to the electric motor 54.

If the responsivity in speed change of the electric motor 54 is not decreased, rotation speed of the motor varies furiously, and tilting speed variation and furious oil pressure variation occur. By carrying out the control according to the eighth embodiment, the responsivity is slowed down, fast and furious change is suppressed, and easy operability is ensured.

The Ninth Embodiment

Figure 11:
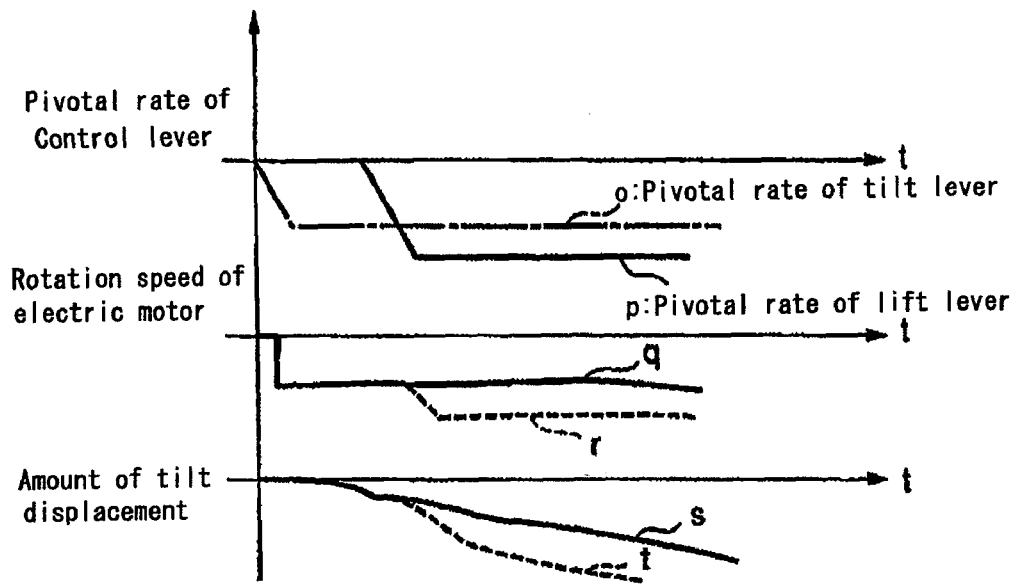
FIG. 11 is a diagram as in FIG. 9, showing the ninth embodiment of the invention.

Next, the ninth embodiment of control method of the invention in the hydraulic lift device of the fifth embodiment shown in FIG. 6 will be explained with reference to FIG. 11. In FIG. 11, a line o shows the pivotal rate of the tilt lever 63, a line p shows the pivotal rate of the lift lever 62. In the fifth embodiment, the hydraulic motor 56 is larger than the hydraulic pump 53 in theoretic volume capacity of oil flow so that rotation speed of the electric motor 54 is about the same at the rated speed of tilting operation and at the rated speed of lowering operation.

By this, when lowering and tilting operations are carried out simultaneously, variation of the rotation speed of the electric motor 54 can be suppressed, tilt speed variation can be suppressed, and easy operability of the hydraulic lift device can be ensured. In FIG. 11, a line q shows the number of rotations of the electric motor in the case the number of rotations of the electric motor at the rated tilting speed is about the same as that at the rated lowering speed. A line r shows the change of the rotation number of the electric motor in the case the number of rotations of the electric motor differs largely at both the rated speeds. A line s shows the amount of tilt displacement in the case the number of rotations of the electric motor is about the same at both the rated speeds, and a line t shows the amount of tilt displacement in the case the number of rotations of the electric motor differs largely at both the rated speeds.

The Tenth Embodiment

Figure 12:
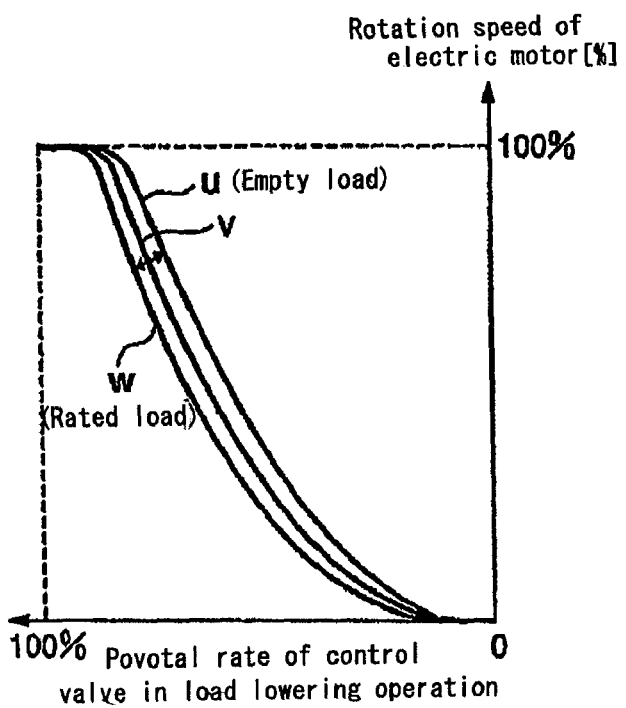
FIG. 12 is a diagram showing the relation between the pivotal rate of the control lever and rotation speed of the electric motor, showing the tenth embodiment of the invention.

Next, the tenth embodiment of control method the invention in the hydraulic lift device of the fifth embodiment shown in FIG. 6 will be explained with reference to FIG. 12. Pressure in the bottom oil chamber 51a of the lift cylinder 51 is detected by the pressure sensor 30 shown in FIG. 1, and responsivity in the rotation speed of the electric motor 54 to the pivotal rate of the control lever is changed based on the detected pressure. In FIG. 12, a curve u, w, and v show the number of rotations of the electric motor when no load is on the fork F, when a rated load is on the fork F, and when an intermediate load between no load and the rated load is on the fork F, respectively.

Like this, when the load on the fork F is heavy, by decreasing the responsivity in the rotation speed of the electric motor 54, fine-adjusting operation range is widened, fast and furious operation can be prevented, and safety of operation is improved

INDUSTRIAL APPLICABILITY

According to the present invention, a method and a system compact in structure for recovering the potential energy generated by a hydraulic lift device in a battery operated industrial tracks such as a forklift truck or the like can be provided, in which working fluid can be supplied to other actuators while performing the energy recovering operation, occurrence of oil pressure pulsation in the energy recovering operation is prevented, operability is increased, and energy recovering efficiency is improved.

The invention claimed is:

1. An energy recovering method in a hydraulic lift device of a battery operated industrial truck which is provided with a lift cylinder for lifting a lift means, an electric motor driven by a battery power source, a hydraulic pump for supplying pressurized working fluid to said lift cylinder to lift said lift means, and a control valve disposed between said lift cylinder and said hydraulic pump, whereby said electric motor is allowed to function as an electric generator driven by said hydraulic pump which is allowed to work as a hydraulic motor driven by pressurized working fluid returning from said lift cylinder to the hydraulic pump when a load on said lift means is lowered, and potential energy of the load is recovered as electric power to the battery, wherein lowering speed of said lift means is controlled by controlling the amount of opening of said control valve for controlling the flow rate of the pressurized working fluid returning to the hydraulic pump and rotation speed of said electric motor, and said control valve is opened to be larger than the amount of valve opening corresponding to rotation speed of the electric motor, in which rotation speed depends on the flow rate of the returning working fluid and therefore depends on the amount of the valve opening, so that lowering speed of said lift means is controlled by directly controlling rotation speed of the electric motor.

2. An energy recovering method according to claim 1, wherein said electric motor is rotated before said control valve is opened at the start of lowering operation.

3. An energy recovering method according to claim 1, wherein said hydraulic lift device is provided with a second actuator for supplying pressurized fluid by means of said hydraulic pump via a second control valve, and when operation of lowering said lift means and operation of said second actuator are performed simultaneously, rotation speed of said electric motor is controlled to correspond only to the lowering speed of the lift means.

4. An energy recovering system in a hydraulic lift device of a battery operated industrial truck which is provided with a lift cylinder for lifting a lift means, an electric motor driven by a battery power source, a hydraulic pump for supplying pressurized working fluid to said lift cylinder to lift said lift means, and a control valve disposed between said lift cylinder and said hydraulic pump, whereby said electric motor is allowed to function as an electric generator driven by said hydraulic pump which is allowed to work as a hydraulic motor driven by pressurized working fluid returning from said lift cylinder to the hydraulic pump when a load on said lift means is lowered, and potential energy of the load is recovered as electric power to the battery, wherein a controller is provided which controls lowering speed of said lift means by controlling the amount of opening of said control valve for controlling the flow rate of the pressurized working fluid returning to said hydraulic pump and the rotation speed of said electric motor, and wherein, said controller controls the opening of said valve to be larger than the amount of valve opening corresponding to rotation speed of the electric motor, in which rotation speed depends on the flow rate of the returning working fluid and therefore depends on the amount of the valve opening, so that lowering speed of said lift means is controlled by directly controlling rotation speed of the electric motor.

5. An energy recovering system according to claim 4, wherein a hydraulic motor driven by pressurized working fluid returning from said lift cylinder is disposed in a fluid path for recovering the working fluid to a working fluid reservoir tank via said control valve, and said hydraulic motor is connected to said electric motor with a one-way clutch which allows torque transmission only from said hydraulic motor to said electric motor.

6. An energy recovering system according to claim 5, wherein said second actuator is a tilt cylinder for tilting a mast provided with a fork of the forklift truck.

7. An energy recovering system according to claim 5, wherein a second actuator for carrying out other operation in addition to said lift cylinder is provided, and pressurized working fluid is supplied by said hydraulic pump to said second actuator via a second control valve.

8. An energy recovering system according to claim 4, wherein a second actuator for carrying out other operation in addition to said lift cylinder is provided, and pressurized working fluid is supplied by said hydraulic pump to said second actuator via a second control valve.

9. An energy recovering system according to claim 8, wherein said hydraulic motor is larger in theoretic volume capacity of working fluid flow than that of said hydraulic pump, and rotation speed of said electric motor is substantially equal both at rated speeds of tilting operation and lowering operation.

10. An energy recovering system according to claim 8, wherein said second actuator is a tilt cylinder for tilting a mast provided with a fork of the forklift truck.

11. An energy recovering system according to claim 4, wherein said controller is provided with an arithmetic circuit for decreasing responsivity in speed change of said electric motor to a directive to change rotation speed of said electric motor.

12. An energy recovering system according to claim 4, wherein a pressure sensor for detecting pressure in a bottom oil chamber of said lift cylinder is provided, and responsivity in speed change of said electric motor is changed based on the pressure detected by said pressure sensor.

13. An energy recovering system according to claim 4, wherein are provided a pressure sensor for detecting pressure in a bottom oil chamber of said lift cylinder, a band pass filter for computing pressure pulsation value from the pressure detected by said pressure sensor, and an arithmetic circuit for adding aintiphased pulsation value of said pulsation value to a rotation speed directive for said electric motor.

14. An energy recovering method in a hydraulic lift device which is provided with a lift cylinder for lifting a lifting unit, an electric motor driven by a battery power source, a hydraulic pump for supplying pressurized working fluid to said lift cylinder to lift said lifting unit, and a control valve disposed between said lift cylinder and said hydraulic pump, whereby said electric motor is allowed to function as an electric generator driven by said hydraulic pump which is allowed to work as a hydraulic motor driven by pressurized working fluid returning from said lift cylinder to the hydraulic pump when a load on said lifting unit is lowered, and potential energy of the load is recovered as electric power to the battery, wherein lowering speed of said lifting unit is controlled by controlling the amount of opening of said control valve for controlling the flow rate of the pressurized working fluid returning to the hydraulic pump and rotation speed of said electric motor, said control valve is opened to be larger than the amount of valve opening corresponding to rotation speed of the electric motor, in which rotation speed depends on the flow rate of the returning working fluid and therefore depends on the amount of the valve opening, so that lowering speed of said lifting unit is controlled by directly controlling rotation speed of the electric motor.

* * * * *